United States Patent
Kazmierowicz et al.

(10) Patent No.: US 6,606,537 B1
(45) Date of Patent: Aug. 12, 2003

(54) METHOD FOR CORRECTING PROCESS TEMPERATURE PROFILE IN A MULTI-ZONE THERMAL PROCESSOR

(75) Inventors: Philip C. Kazmierowicz, Estacada, OR (US); Miles F. Moreau, San Diego, CA (US)

(73) Assignee: KIC Thermal Profiling, San Diego, CA (US)

( * ) Notice: Subject to any disclaimer, the term of this patent is extended or adjusted under 35 U.S.C. 154(b) by 0 days.

(21) Appl. No.: 09/839,325

(22) Filed: Apr. 19, 2001

(51) Int. Cl.$^7$ .................. G05D 23/00; G06F 15/46
(52) U.S. Cl. .................. 700/210; 700/209; 700/299; 219/388
(58) Field of Search ................. 700/121, 210, 700/207, 209, 299; 228/9; 219/497, 410, 388

(56) References Cited

U.S. PATENT DOCUMENTS

| | | | |
|---|---|---|---|
| 4,223,385 A | * 9/1980 | Miller et al. | 266/96 |
| 4,246,641 A | * 1/1981 | Babil et al. | 374/1 |
| 4,775,776 A | * 10/1988 | Rahn et al. | 219/388 |
| 4,833,301 A | * 5/1989 | Furtek | 219/388 |
| 4,982,347 A | * 1/1991 | Rackerby et al. | 219/482 |
| 5,232,145 A | * 8/1993 | Alley et al. | 219/390 |
| 5,439,160 A | * 8/1995 | Marcantonio | 228/102 |
| 5,895,596 A | * 4/1999 | Stoddard et al. | 118/725 |
| 5,971,249 A | * 10/1999 | Berkin | 228/102 |
| 6,168,064 B1 | * 1/2001 | Berkin | 219/388 |
| 6,207,936 B1 | * 3/2001 | de Waard et al. | 219/412 |
| 6,275,750 B1 | * 8/2001 | Uchida et al. | 374/11 |
| 6,283,379 B1 | * 9/2001 | Kazmierowicz et al. | 219/388 |
| 6,373,033 B1 | * 4/2002 | de Waard et al. | 219/483 |
| 6,453,219 B1 | * 9/2002 | Kazmierowicz et al. | 700/207 |

* cited by examiner

*Primary Examiner*—Leo Picard
*Assistant Examiner*—Alexander Kosowski
(74) *Attorney, Agent, or Firm*—Thelen Reid & Priest LLP; David B. Ritchie

(57) ABSTRACT

A method for adjusting process temperature measurements used to monitor zone conditions in a reflow oven selects values for exclusion from correlation with the predicted part temperature profile. During the thermal process, a plurality of process temperatures over intervals may be measured along the reflow oven. Over a time period for the thermal process, a measured process temperature of this plurality may be evaluated for the maximum and minimum extremities, from which a difference for that interval may be calculated. This difference may be compared to a qualifier for the plurality, and be excluded from part temperature prediction if the difference for the interval exceeds the qualifier.

In an alternative embodiment, the maximum and/or minimum extremities from the plurality of process temperature measurements may be incorporated to produce a process temperature profile for correlation with the part temperature profile. The incorporation of measurement extremities may substitute for time-integrated measurement values otherwise used for attaining a target part temperature response.

36 Claims, 5 Drawing Sheets

METHOD FOR CORRECTING PROCESS TEMPERATURE PROFILE IN A MULTI-ZONE THERMAL PROCESSOR

STATEMENT OF RELATED APPLICATION

This application is related to U.S. patent application Ser. No. 09/401,749 filed on Sep. 23, 1999 entitled "Method and Apparatus for Controlling Temperature Response of a Part in a Conveyorized Thermal Processor" and filed in the name of inventors Philip C. Kazmierowicz, Eric Dransfeldt and Stanley Douglas Schultz, commonly assigned herewith.

BACKGROUND OF THE INVENTION

1. Field of the Invention

The present invention relates to correcting the process temperature in a multi-zone thermal processor. More specifically, the invention corrects for conditions affecting the measured process temperature for monitoring the heat convection process to a part in a multi-zone conveyorized thermal processor.

2. Background

Thermal processing involves a series of procedures by which an item may be exposed to a temperature-controlled environment, and is used in a variety of manufacturing procedures such as heat treating, quenching and refrigerated storage. One example of a thermal processor is a reflow oven. The production of various goods such as electronic circuit boards in solder reflow ovens frequently entails carefully controlled exposure to heating and/or cooling for specific periods. The elevated temperature conditions needed to solder component leads onto printed circuit boards must be gradually and uniformly applied to minimize thermal expansion stresses.

For this reason, convective heat transfer may be employed in these solder "reflow" operations. The connecting solder paste incorporates an amalgam of substances that must undergo phase changes at separate temperature levels. Solder reflow may be performed by sequentially passing a part (such as a printed circuit board to become a processed product) through a series of thermally isolated adjacent regions or "zones" in the reflow oven, the temperature of each being independently adjusted. The part may be carried by a conveyor, which moves the part into the reflow oven entrance, through the zones, and out of the oven through the exit. The exposure of the part to the reflow oven conditions can be called a thermal process. A thermal process may performed on a part in a calibration run for measuring the part temperature on an instrumented part (in addition to setpoint and/or process temperatures) or a production run (for thermally processing printed circuit boards).

To conform a part's temperature response to a target profile, setpoint temperatures and conveyor speed may be adjusted, and thereby correspond to a particular process temperature profile. Convection being an empirically characterized mode of heat transfer in a fluid medium depends on several factors, including the relative velocity between the medium and the part surface exposed and the temperature difference between the fluid medium (e.g., in the zone) $T_z$ (in proximity to the part) and the physical part $T_p$. In a multi-zone reflow oven, thermal energy exchanged from the setpoint component (e.g., a heating element) to the part may be augmented by moving the fluid medium (typically air) situated therebetween. Moving the air in a zone may accelerate the transient response (thereby reducing the difference towards equilibrium between) the setpoint temperature $T_c$ and the zone or process temperature $T_z$. This air motion may be produced by multi-blade fans rotating inside the zone at a given fan speed.

The process temperature may be measured by instruments (e.g., thermocouples) to monitor ambient conditions to the part. Typically, between thirty and sixty thermocouples may be evenly disposed along a probe in the oven to measure process temperatures. The series of process temperature measurements produce a process temperature profile. A part may also be instrumented for calibration purposes, but usually not in a production thermal process. The differences between measured process and part temperatures may be correlated for specified conditions. An instrument for correlation (e.g., a computer processor) may be used for this purpose. The rate of thermal energy convective exchange between the fluid medium and the part is proportional to their temperature differences. However, the process temperature may be influenced by collateral conditions in select regions of the reflow oven, thereby introducing potential errors in the correlated differences.

A conveyor may carry a part on rollers with axes disposed between two rails. This enables top and bottom surfaces of the part to be exposed to setpoint components above and below the part respectively, without a continuous support platform in between. When the conveyor carries a part from one zone to the next, the part may influence the air motion across the zone interface (perpendicular to the conveyor path). Air from one zone at a first temperature may be deflected by the part's surface to the adjacent zone having a second temperature, causing undesirable mixing in the intruded adjacent zone. Such conditions may influence process temperature measurement, particularly for transition zones between heating and cooling portions of the reflow oven. A transition zone may represent a comparatively quiescent region with minimal air movement. Other zones with more vigorous fan rotation may be less influenced by such cross-flow.

As a part passes from an upstream adjacent zone to a transition zone, the part's surface may deflect air from the upstream adjacent zone into the transition zone. Similarly, as the part is conveyed from the transition zone to a downstream adjacent zone, air from the downstream adjacent zone may move along the part into the transition zone. Such invasive air movement may alter its measured temperature to a value between the typical transition zone average and the influencing air from the adjacent zone. The resulting measured transient response may substantially influence the predicted part temperature profile without a similar corresponding effect on the actual part temperature profile.

Additionally, a part temperature profile may be predicted (for an established control setting) based on a calibration run with only a single instrumented part passing through the oven, while a production run may have a consecutive series of parts staggered in a sequence with uniform or nonuniform spacing therebetween. The measured process temperature in a transition zone may change depending on the quantity of and spacing between parts that facilitate air crossflow from adjacent zones. Such variation in process temperature response may increase the uncertainties associated with predicting the part temperature profile. Current methods lack an adequate means to correct for errors induced by crossflow between zones. Hence, a method to obviate such errors is desired.

BRIEF DESCRIPTION OF THE INVENTION

A method for adjusting process temperature measurements used to monitor zone conditions in a reflow oven selects values for exclusion from correlation with the predicted part temperature profile. During the thermal process, a plurality of process temperatures over intervals may be measured along the reflow oven. Over a time period for the thermal process, a measured process temperature of this plurality may be evaluated for the maximum and minimum extremities, from which a difference for that interval may be calculated. This difference may be compared to a qualifier for the plurality, and be excluded from part temperature prediction if the difference for the interval exceeds the qualifier.

Alternatively, the maximum and/or minimum extremities from the plurality of process temperature measurements may be incorporated to produce a process temperature profile for correlation with the part temperature profile. The incorporation of measurement extremities may substitute for time-integrated measurement values otherwise used for attaining a target part temperature response.

BRIEF DESCRIPTION OF THE DRAWINGS

The accompanying drawings, which are incorporated into and constitute a part of the specification, illustrate one or more embodiments of the present invention and, together with the detailed description, serve to explain the principles and implementations of the invention.

In the drawings.

DETAILED DESCRIPTION OF THE INVENTION

Embodiments of the present invention are described herein in the context of a method for correcting a process temperature prediction between zones in a multi-zone thermal processor. Those of ordinary skill in the art will realize that the following description of the present invention is illustrative only and not in any way limiting. Other embodiments of the invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine figures of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

Figure 1:
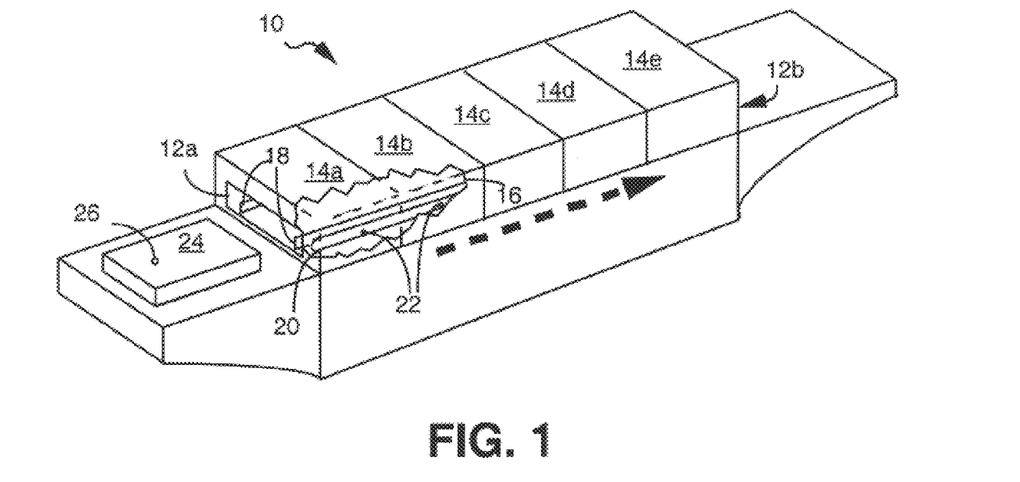
FIG. 1 is an isometric diagram of a multi-zone reflow oven in accordance with a preferred embodiment of the present invention.

A reflow oven shown in isometric view in FIG. 1 features items in conjunction with the present invention. The multi-zone reflow oven 10 includes an entrance 12a and exit 12b between which a series of zones 14a, 14b, 14c, 14d and 14e may be disposed. Reflow ovens as intended for this invention may exhibit a variety of configurations with more or fewer temperature conditioning zones than illustrated. A cut-away region 16 reveals a pair of rails 18 and a temperature probe 20 having a plurality of thermocouples 22 or alternate temperature measuring devices disposed along its length. The rails may be used to convey a part 24 sequentially through the oven 10 from zone 14a to zone 14e in the direction shown by the dashed arrow. One or more thermocouples 26 may be incorporated onto the part 24 for measuring the part temperature during a calibration run.

Figure 2:
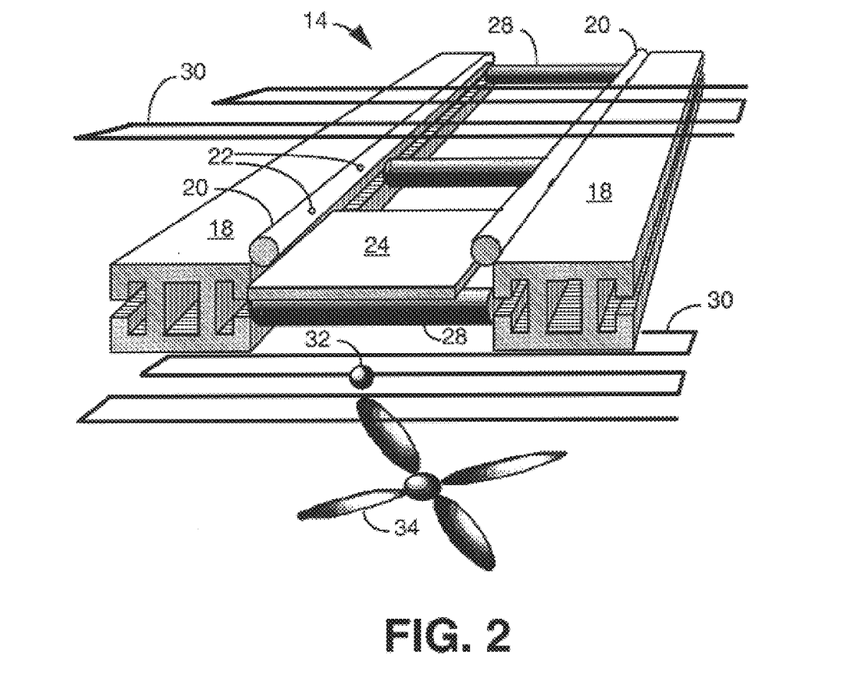
FIG. 2 is an isometric diagram illustrating a zone interior in accordance with a preferred embodiment of the present invention.

An isometric view in FIG. 2 of the interior of a zone illustrates additional details. A pair of temperature probes 20 having thermocouples 22 to measure the process temperature may be suspended adjacent to the rails 18. A plurality of rollers 28 may be disposed between the rails 18 to propel the part 26 along the conveyor. A pair of setpoint components 30 (e.g., heating elements) may be disposed above and/or below the rails 18. The setpoint temperature may be measured by a thermocouple 32 or other temperature measuring device. A multi-blade rotating fan 34 may circulate air within the zone 14 to enhance conductive heat transfer through the air by forced convection.

Figure 3:
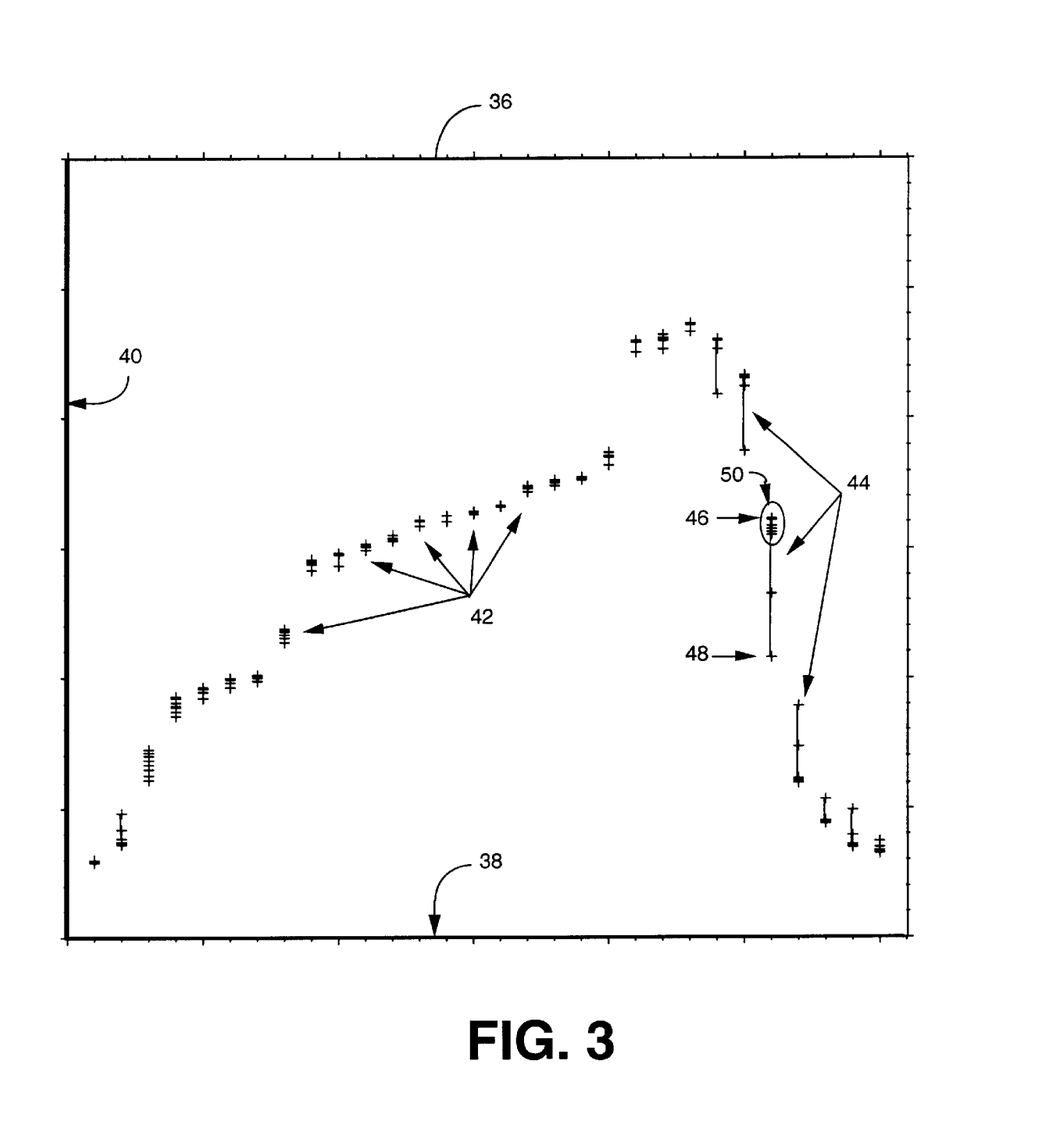
FIG. 3 is a graph diagram illustrating process temperature measurements along the oven length in accordance with a preferred embodiment of the present invention.

During a thermal process, temperature measurements may be acquired and recorded for the setpoint component at thermocouple 32 and the zone at thermocouple 22 on the probe 20. Data acquisition and correlation may be executed by an automated or programmed instrument (e.g., computer). FIG. 3 shows a first graph 36 representing the process temperatures in the oven used to monitor the part temperature profile. The abscissa 38 presents thermocouple numbers for positions disposed along the oven 10, while the ordinate 40 depicts temperature (scaled from 0° F. to 300° F.). The process temperature measurements 42, 44 from thermocouples 22 to produce a process temperature profile may vary over time, depending on the convective influences from adjacent zones.

Thermocouple positions exhibiting comparatively small variations in temperature values 42 may be considered thermally stable and hence reliable for evaluating or controlling part temperature. Thermocouple positions exhibiting comparatively large variations in temperature values 44 (as depicted by lines spanning the maximums and minimums) may be considered thermally unreliable for evaluating part temperature. One example of a thermocouple position having large variations 44 identifies a maximum value 46 and a minimum value 48. A cluster of data 50 may be observed in proximity to the maximum value 46 (for this location). A concentration of measured values towards one end suggests that this end may be more representative of oven conditions over time than its opposite end. A more uniform distribution or a concentration towards the middle might present an alternative conclusion.

Figure 4:
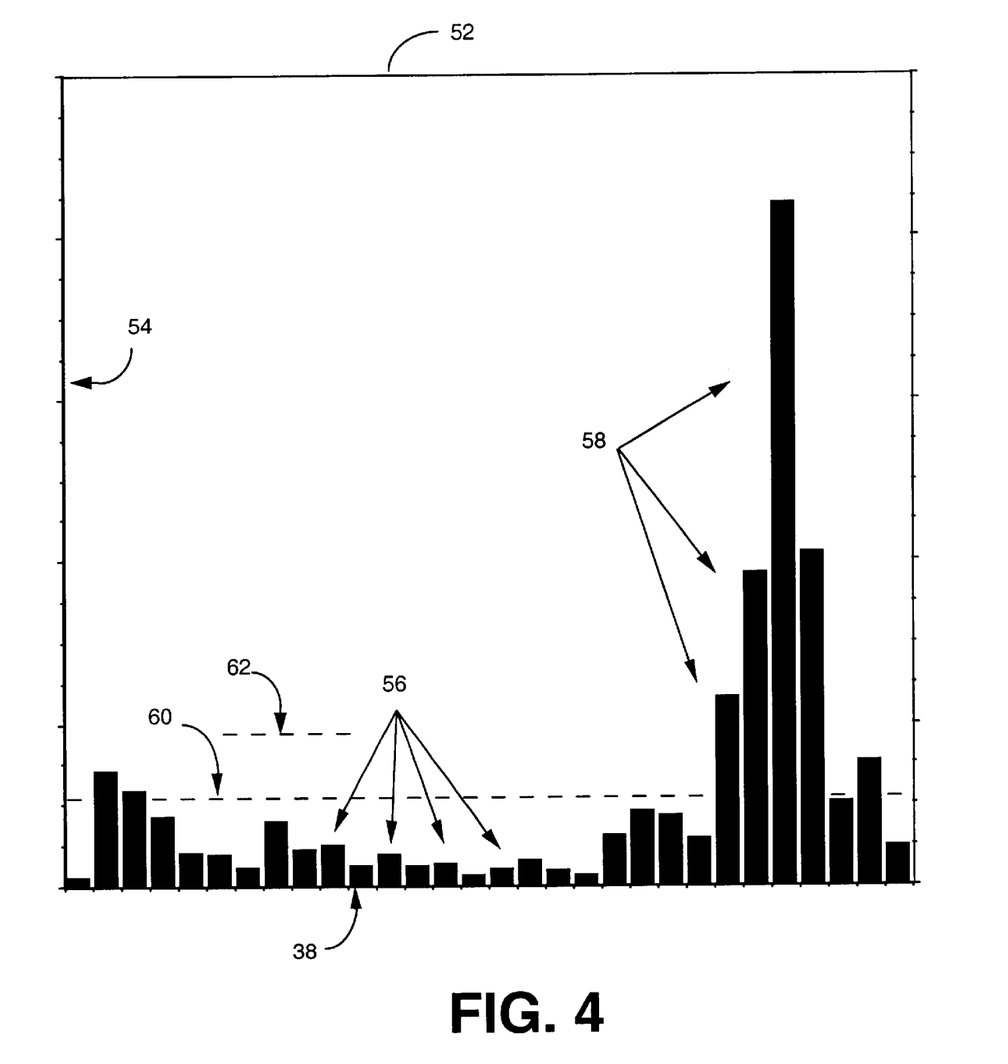
FIG. 4 is a graph diagram illustrating process temperature differences between maximum and minimum values along the oven length in accordance with a preferred embodiment of the present invention.

FIG. 4 provides a second graph 52 with thermocouple position as abscissa 38 and temperature difference as ordinate 54 (scaled from 0° F. to 100° F.). The variation over time of measurements produce maximum 46 and minimum 48 values that can be subtracted from each other to provide temperature differences. These differences may be plotted as columns along the abscissa 38. Temperature measurements exhibiting comparatively minor variation may feature acceptable differences 56 between their maximums and minimums. These may be contrasted with much larger differences 58 between maximum and minimum values that indicate comparably severe deviations over time. The largest differences 58 may be few in number and quantitatively much greater than their small difference counterparts 56. The influence of these temperature measurements having the largest variations (as exemplified by their differences 58) on part temperature profile prediction may be undesirable.

The entire interval sequence of differences may be summed and divided by their total number to obtain the average 60 drawn across the graph 52. Below the average 60 or an appropriate (possibly linear) function thereof 62 assigned to a qualifier value for comparison, a difference 56 may be considered acceptable. Above the average 60 or related function 62, a difference 58 may identify measurements (at particular time periods) from its thermocouple position to be suspect. The variation indicated by this difference 58 may represent either a change in boundary conditions, or reflect random fluctuations.

The average difference 60 or related function 62 may be used as a characteristic statistical parameter in this example, and is not intended to be limiting. Alternatively, a median or other qualifier value may be used. The means for calculating differences 56, 58 and their average or function 60, 62 may include (but are not limited to) hardware devices and/or software code. Those of ordinary skill in the art can recognize other criteria for excluding (or including) selected temperature values from a particular interval that may be used without departing from the scope of the invention.

A series of process thermocouples (or other means of temperature measurement) may be labeled sequentially as i=1, 2, . . . , n. These values may but need not correspond to the number of zones. The measured process temperature from thermocouples 22 at interval i may be identified as functions of time $T_{z-i}(t)$. Over a time period from $0 \leq t \leq \tau$, a difference $\Delta_i$ at interval i between the maximum 46 and minimum 48 values of process temperature $T_{z-i}(t=0, \ldots, \tau)$ may be calculated for each interval i. An average difference $\Delta_{ave}$ may be found by summing the differences for all the sequences and dividing by the number of interval sequences n expressed as $\Delta_{ave} = [\Sigma_{i=1, \ldots, n} \Delta_i]/n$.

In a specific embodiment of the present invention, difference values exceeding the average $\Delta_i > \Delta_{ave}$ may be excluded from feedback used to predict the part temperature profile. The criterion for exclusion may be adjusted by a bias and/or a factor, such as by excluding values $\Delta_i > c_1 \Delta_{ave} + c_2$, where $c_1$ represents the multiplying factor and $c_2$ the bias adjustment. A polynomial may also be substituted for the right hand side relation.

Figure 5:
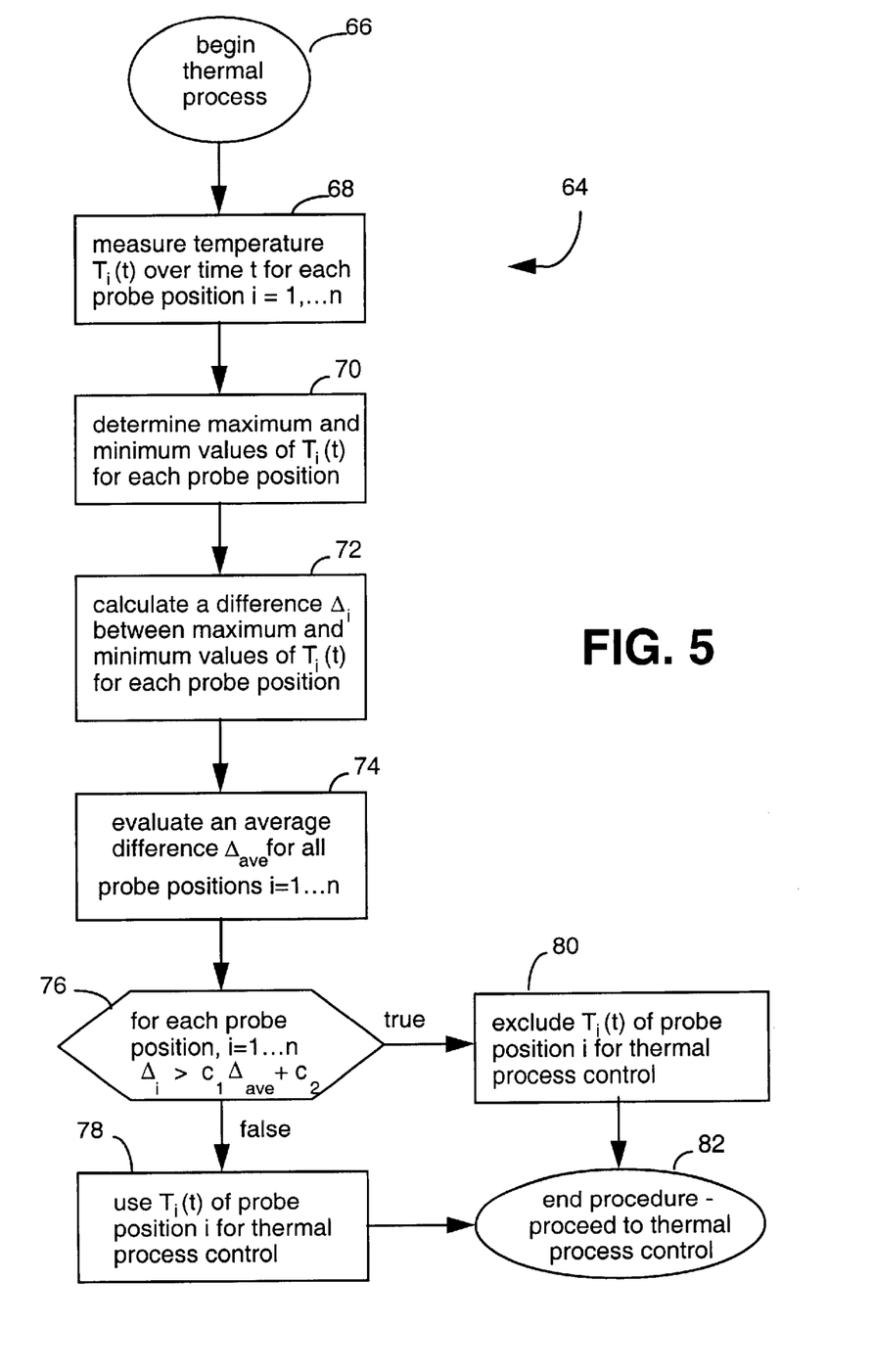
FIG. 5 is a flowchart diagram illustrating a procedure for selecting temperature probe positions for thermal process control in accordance with a preferred embodiment of the present invention.

FIG. 5 illustrates a flow diagram 64 in accordance with a specific embodiment of the present invention. As the thermal process 66 begins, temperature measurements 68 are made for each thermocouple position 22 on the probe 20. The probe positions are denoted from intervals i=1, . . . , n, and the temperature is measured over a time period appropriate to the thermal process. Maximum 46 and minimum 48 values of process temperature over the time period are determined 70 for each interval. Differences $\Delta_i$ between maximum and minimum values for each interval may be calculated as 72, from which an average 60 difference $\Delta_{ave}$ can be found 74.

For each probe position, the difference $\Delta_i$ may be compared 76 against a qualifier value, e.g., the average 60 or its function 62 such as $c_1 \Delta_{ave} + c_2$, where $c_1$ and $c_2$ are factor and bias coefficients, respectively. If difference at the interval does not exceed the average function 62 as expressed by $\Delta_i \leq c_1 \Delta_{ave} + c_2$, then the temperature measurements of that interval acquired as 68 may be used as 78 for part temperature monitoring. Otherwise, if difference exceeds the average function 62 as $\Delta_i > c_1 \Delta_{ave} + c_2$, then these temperature measurements acquired as 68 may be excluded as 80 for part temperature monitoring. The flow diagram 64 may be terminated as completed 82 for further instructions in thermal processing.

In another specific embodiment to the present invention, the maximum extreme 46 or the minimum extreme 48, or a weighted addition of the minimum and maximum extremes may be used for monitoring and adjusting the setpoint conditions. The selecting and/or weighting of extremes may correspond to whichever extreme the measured data cluster 50 congregates near. Such a selection may be preferred over time-averaged temperature values as expressed by integral form $[\int_0^\tau T_z dt / \int_0^\tau dt]_i$ to integrate process temperature $T_z$ for a particular interval i along the probe 20. For example, a thermocouple 22 at interval i may be disposed within an oven region having larger differences 58, exceeding the average function 62.

Figure 6:
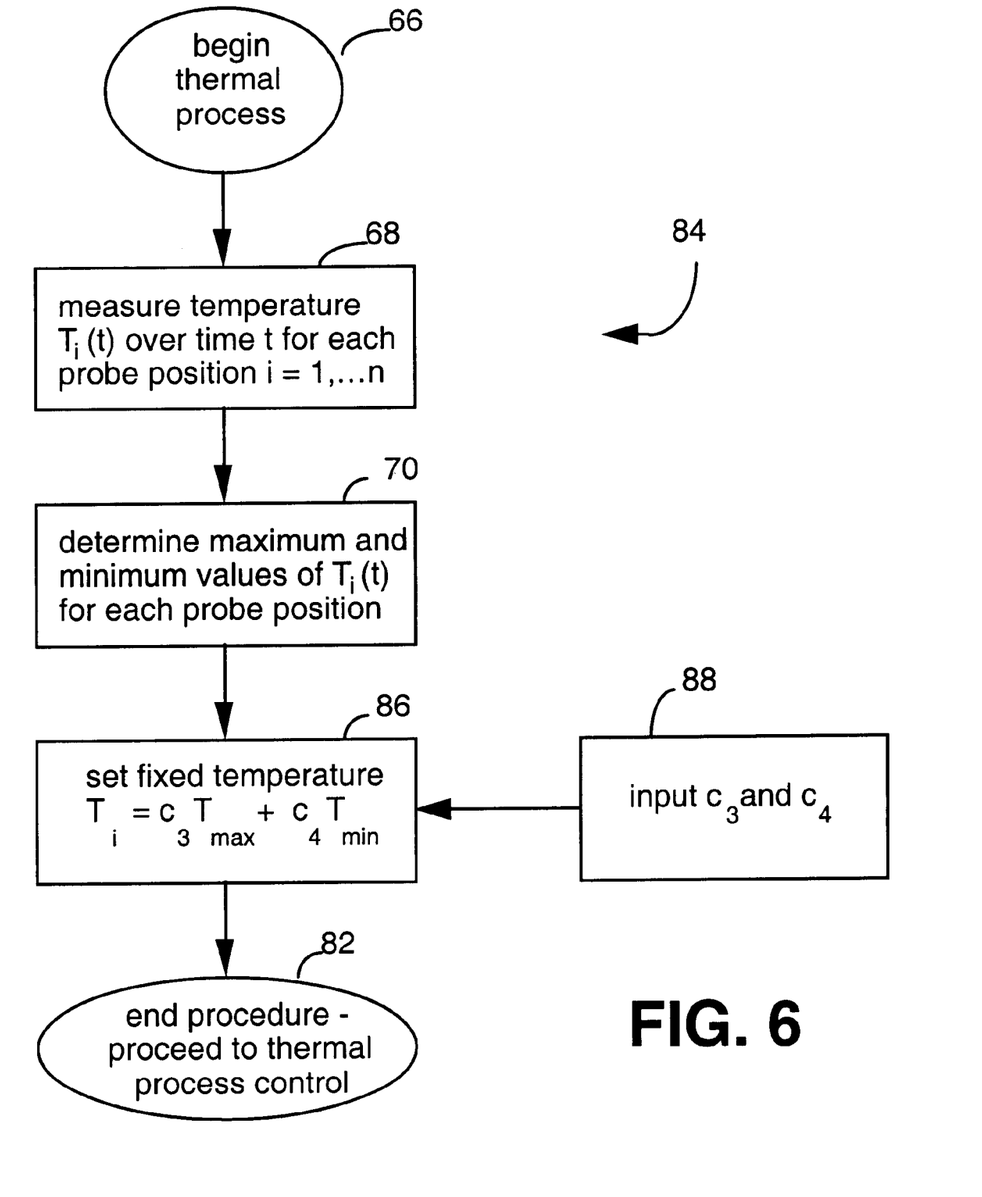
FIG. 6 is a flowchart diagram illustrating a procedure for selecting temperature probe positions for thermal process control in accordance with another preferred embodiment of the present invention.

FIG. 6 illustrates a flow diagram 84 in accordance with another specific embodiment of the present invention. As the thermal process 66 begins, temperature measurements 68 are made for each thermocouple position 22 on the probe 20. The probe positions may be denoted from intervals i=1, . . . , n, and the temperature can be measured over a time period appropriate to the thermal process. Maximum 46 and minimum 48 values of temperature over the time period may be determined 70 for each probe interval.

The temperature value for each interval passed for part temperature profile prediction may be selected from a characteristic value, such as the maximum, the minimum or combination thereof as 86. A generalized formula may be expressed as $T_{z-i} = c_3 T_{z-max} + c_4 T_{z-min}$. The parameters in this formula are represented by $T_{z-i}$ as the process temperature at interval i (fixed across a selected time period); $T_{z-max}$ as the maximum extremity 46; $T_{z-min}$ as the minimum extremity 48, and $c_3$ and $c_4$ as multiplying coefficients. The coefficients may be restricted by an independent relation such as $c_3 + c_4 = 1.0$ and/or $c_3, c_4 \geq 0$ and may correspond to data cluster 50 position. For example, a coefficient inequality $c_3 > c_4$ may result if data cluster 50 is closer to maximum 46 than to minimum 48, and vice versa. These coefficients may be input as 88 to the temperature selection 86, or they may be established by criteria related to the process temperature profile (such as proximity of data cluster 50 to maximum 46 or minimum 48 values). Upon completion of temperature level selection as 86, the procedure ends as 82 and proceeds to part temperature monitoring.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for discriminating process temperature measurements used to predict a part temperature profile applied to a part in a thermal processor, said thermal processor having a correlation for predicting said part temperature profile, a plurality of zones and a plurality of temperature measuring devices disposed along said plurality of zones, said method comprising:

conveying the part into and out of the thermal processor through the plurality of zones for thermal processing within a time period;

measuring a process temperature during said time period by a temperature measuring device within the plurality of temperature measuring devices, said process temperature being aggregated to a plurality of process temperatures to form a process temperature profile;

calculating a difference between a maximum value and a minimum value within said process temperature profile;

comparing said difference to a qualifier value, assigning a logical value to a first value if said difference exceeds said qualifier value; and disregarding said process temperature for inclusion in said process temperature profile by the corrector if said logical value equals said first value.

2. A method according to claim 1 wherein said plurality of temperature measuring devices are disposed on a probe installed in the thermal processor.

3. A method according to claim 1 wherein said qualifier value equals a characteristic statistical parameter multiplied by a first coefficient and adjusted by a second coefficient, said characteristic statistical parameter combining a plurality of differences calculated from said plurality of process temperatures.

4. A method according to claim 3 wherein said characteristic statistical parameter equals an average.

5. A method according to claim 3 wherein said characteristic statistical parameter equals a median.

6. A method for discriminating process temperature measurements used to predict a part temperature profile applied to a part in a thermal processor, said thermal processor having a correlation for predicting said part temperature profile, a plurality of zones and a plurality of temperature measuring devices disposed along said plurality of zones, said method comprising:

conveying the part into and out of the thermal processor through the plurality of zones for thermal processing within a time period;

measuring a process temperature during said time period by a temperature measuring device within the plurality of temperature measuring devices, said process temperature being aggregated to a plurality of process temperatures to form a process temperature profile;

determining a characteristic value to said process temperature, wherein said characteristic value is a function of a maximum value and a minimum value for said process temperature during said time period; and assigning said characteristic value as a constant to replace said measured process temperature in said process temperature profile.

7. A method according to claim 6 wherein said plurality of temperature measuring devices are disposed on a probe installed in the thermal processor.

8. A method according to claim 6 wherein said characteristic value equals said maximum value.

9. A method according to claim 6 wherein said characteristic value equals said minimum value.

10. A method according to claim 6 wherein said characteristic value equals said maximum value multiplied by a third coefficient plus said minimum value multiplied by a fourth coefficient.

11. A method according to claim 10 wherein said third and fourth coefficients added together equal unity.

12. A method according to claim 11 wherein said third and fourth coefficients both exceed zero.

13. A programmable storage device readable by a machine tangibly embodying a program of instructions executable by the machine to perform method steps for discriminating process temperature measurements used to predict a part temperature profile applied to a part in a thermal processor, said thermal processor having a correlation for predicting said part temperature profile, a plurality of zones and a plurality of temperature measuring devices disposed along said plurality of zones, said method steps comprising:

conveying the part into and out of the thermal processor through the plurality of zones for thermal processing within a time period;

measuring a process temperature during said time period by a temperature measuring device within the plurality of temperature measuring devices, said process temperature being aggregated to a plurality of process temperatures to form a process temperature profile;

calculating a difference between a maximum value and a minimum value within said process temperature profile;

comparing said difference to a qualifier value, assigning a logical value to a first value if said difference exceeds said qualifier value; and disregarding said process temperature profile by the correlation if said logical value equals said first value.

14. A programmable storage device according to claim 13 wherein said plurality of temperature measuring devices are disposed on a probe installed in the thermal processor.

15. A programmable storage device according to claim 13 wherein said qualifier value equals a characteristic statistical parameter multiplied by a first coefficient and adjusted by a second coefficient, said characteristic statistical parameter combining a plurality of differences calculated from said plurality of process temperatures.

16. A programmable storage device according to claim 15 wherein said characteristic statistical parameter equals an average.

17. A programmable storage device according to claim 15 wherein said characteristic statistical parameter equals a median.

18. A programmable storage device readable by a machine tangibly embodying a program of instructions executable by the machine to perform method steps for discriminating process temperature measurements used to predict a part temperature profile applied to a part in a thermal processor, said thermal processor having a correlation for predicting said part temperature profile, a plurality of zones and a plurality of temperature measuring devices disposed along said plurality of zones, said method steps comprising:

conveying the part into and out of the thermal processor through the plurality of zones for thermal processing within a time period;

measuring a process temperature during said time period by a temperature measuring device within the plurality of temperature measuring devices, said process temperature being aggregated to a plurality of process temperatures to form a process temperature profile;

determining a characteristic value to said process temperature, wherein said characteristic value is a function of a maximum value and a minimum value for said process temperature during said time period; and assigning said characteristic value as a constant to replace said measured process temperature in said process temperature profile.

19. A programmable storage device according to claim 18 wherein said plurality of temperature measuring devices are disposed on a probe installed in the thermal processor.

20. A programmable storage device according to claim 18 wherein said characteristic value equals said maximum value.

21. A programmable storage device according to claim 18 wherein said characteristic value equals said minimum value.

22. A programmable storage device according to claim 18 wherein said characteristic value equals said maximum value multiplied by a third coefficient plus said minimum value multiplied by a fourth coefficient.

23. A programmable storage device according to claim 22 wherein said third and fourth coefficients added together equal unity.

24. A programmable storage device according to claim 23 wherein said third and fourth coefficients both exceed zero.

25. A device for discriminating process temperature measurements used to predict a part temperature profile applied to a part in a thermal processor, said thermal processor having a correlation for predicting said part temperature profile, a plurality of zones and a plurality of temperature measuring devices disposed along said plurality of zones, said device comprising:

a means for conveying the part into and out of the thermal processor through the plurality of zones for thermal processing within a time period;

a means for measuring a process temperature during said time period by a temperature measuring device within the plurality of temperature measuring devices, said process temperature being aggregated to a plurality of process temperatures to form a process temperature profile;

a means for calculating a difference between a maximum value and a minimum value within said process temperature profile;

a means for comparing said difference to a qualifier value, assigning a logical value to a first value if said difference exceeds said qualifier value; and a means for disregarding said process temperature profile by the correlation if said logical value equals said first value.

26. A device according to claim 25 wherein said plurality of temperature measuring devices are disposed on a probe installed in the thermal processor.

27. A device according to claim 25 wherein said qualifier value equals a characteristic statistical parameter multiplied by a first coefficient and adjusted by a second coefficient, said characteristic statistical parameter combining a plurality of differences calculated from said plurality of process temperatures.

28. A device according to claim 27 wherein said characteristic statistical parameter equals an average.

29. A device according to claim 27 wherein said characteristic statistical parameter equals a median.

30. A device for discriminating process temperature measurements used to predict a part temperature profile applied to a part in a thermal processor, said thermal processor having a correlation for predicting said part temperature profile, a plurality of zones and a plurality of temperature measuring devices disposed along said plurality of zones, said method comprising:

a means for conveying the part into and out of the thermal processor through the plurality of zones for thermal processing within a time period;

a means for measuring a process temperature during said time period by a temperature measuring device within the plurality of temperature measuring devices, said process temperature being aggregated to a plurality of process temperatures to form a process temperature profile;

a means for determining a characteristic value to said process temperature, wherein said characteristic value is a function of a maximum value and a minimum value for said process temperature during said time period; and a means for assigning said characteristic value as a constant to replace said measured process temperature in said process temperature profile.

31. A device according to claim 30 wherein said plurality of temperature measuring devices are disposed on a probe installed in the thermal processor.

32. A device according to claim 30 wherein said characteristic value equals said maximum value.

33. A device according to claim 30 wherein said characteristic value equals said minimum value.

34. A device according to claim 30 wherein said characteristic value equals said maximum value multiplied by a third coefficient plus said minimum value multiplied by a fourth coefficient.

35. A device according to claim 34 wherein said third and fourth coefficients added together equal unity.

36. A device according to claim 35 wherein said third and fourth coefficients both exceed zero.

* * * * *

UNITED STATES PATENT AND TRADEMARK OFFICE
CERTIFICATE OF CORRECTION

PATENT NO. : 6,606,537 B1
DATED : August 12, 2003
INVENTOR(S) : Philip C. Kazmierowicz and Miles F. Moreau It is certified that error appears in the above-identified patent and that said Letters Patent is hereby corrected as shown below:

<u>Title page,</u>
Item [57], ABSTRACT,
Line 31, replace "In an alternative embodiment," with -- In another aspect, --.

<u>Column 1,</u>
Line 49, replace "performed" with -- be performed --.

<u>Column 2,</u>
Line 14, replace "(e.g., a computer processor)" with -- (e.g., a computer processor or "correlater") --.

<u>Column 4,</u>
Line 55, replace "computer)." with -- computer or "correlator"). --.

<u>Column 7,</u>
Lines 17 and 54, replace "correlation" with -- correlator --.
Line 36, replace "corrector" with -- correlator --.

<u>Column 8,</u>
Lines 26 and 45-46, replace "correlation" with -- correlator --.

<u>Column 9,</u>
Lines 1-2 and 43, replace "correlation" with -- correlator --.

<u>Column 10,</u>
Lines 5 and 22, replace "correlation" with -- correlator --.

Signed and Sealed this

Twenty-fifth Day of May, 2004

JON W. DUDAS
*Acting Director of the United States Patent and Trademark Office*